Sept. 28, 1937.  C. H. WATT  2,094,509
SURGICAL SPLINT
Filed Aug. 25, 1936   2 Sheets-Sheet 1

Inventor
Charles H. Watt.
By Munn, Anderson & Liddy
Attorney

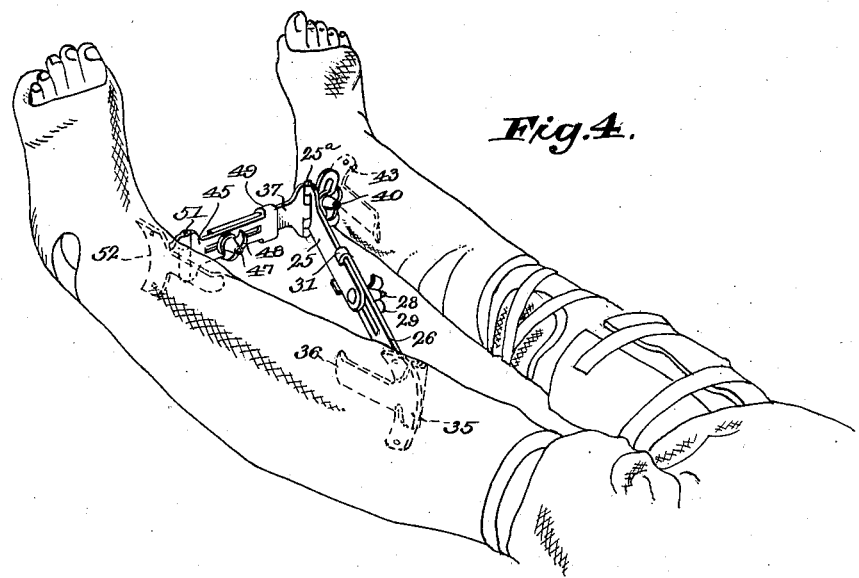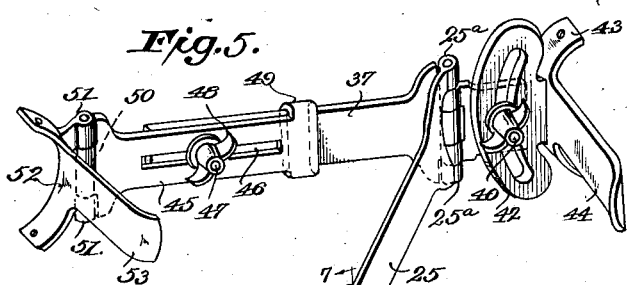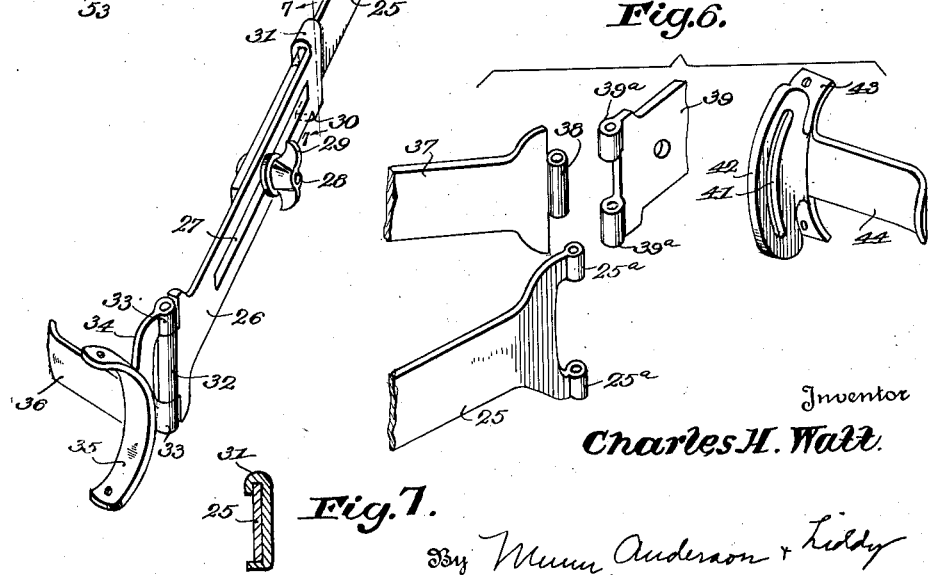

Patented Sept. 28, 1937

2,094,509

UNITED STATES PATENT OFFICE 2,094,509

SURGICAL SPLINT

Charles H. Watt, Thomasville, Ga.

Application August 25, 1936, Serial No. 97,835

4 Claims. (Cl. 128—84)

My invention relates to improvements in surgical splints, such as are used for the reduction of fractures of the femur and pelvic bones of the human body, and it consists in the combinations, constructions, and arrangements herein described and claimed.

The surgical tractor disclosed herein forms a portion of the splint assembly, the other portion of the splint assembly consisting of a surgical immobilizer which forms the subject of a separate invention embodied in a co-pending application, Serial No. 98,175, filed Aug. 27, 1936.

An object of the present invention is to provide a tractor member in a splint which will afford a minimum amount of pressure on the hip of the well leg while at the same time obtaining a maximum or a sufficient amount of traction on the fractured leg.

A further object is to provide a tractor member in a splint that will pull directly from the femur and not from the tibia, thus avoiding pull through the knee joint.

A further object is to provide a splint, including a tractor, which when applied will not inconvenience the patient in the bed.

A further object is to provide a splint, including a tractor member that may be removed, when satisfactory reduction has been attained, after which the fractured leg is held by the immobilizer, thus permitting the use of the tractor on another patient.

A still further object of the invention is to provide a tractor device which is simple in construction, of light weight, and which on account of its simplicity can be made at a relatively low cost and sold at a low price.

Other objects and advantages will appear in the following specification and the novel features of the invention will be particularly pointed out in the appended claims.

My invention is illustrated in the accompanying drawings forming part of this application, in which:—

Figure 1:
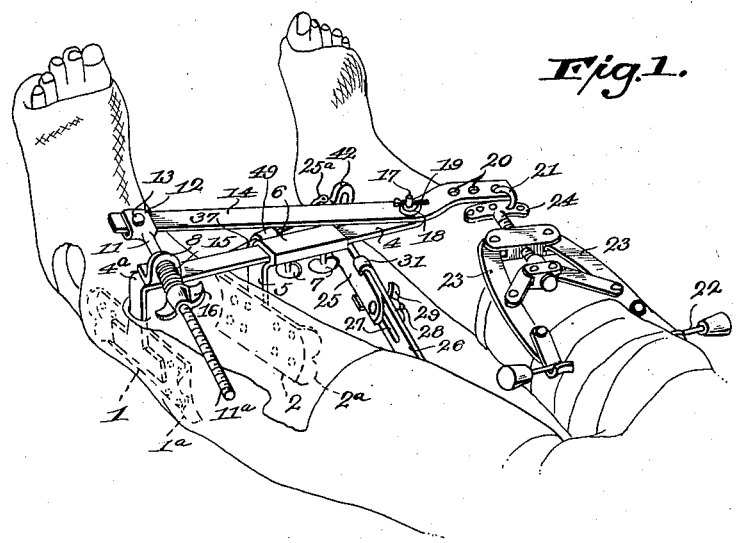
Figure 2:
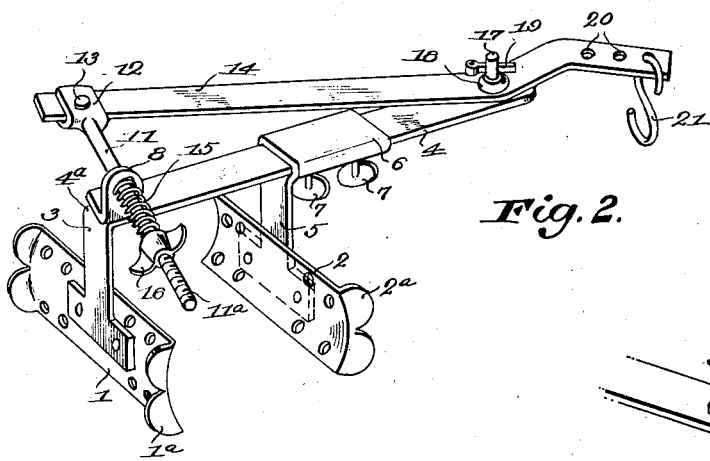
Figure 3:
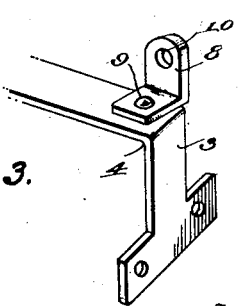

Figure 1 is a perspective view showing the application of the splint as a whole including the tractor and immobilizer, Figure 2 is a perspective view of the tractor, Figure 3 is a detail view in perspective showing a swivel connection, Figure 4 is a perspective view showing the application of the immobilizer to the patient, Figure 5 is a perspective view of the immobilizer, Figure 6 is a perspective view showing certain parts in their separated relative positions, and Figure 7 is a section along the line 7—7 of Figure 5.

Since the tractor and immobilizer are used together a description of both will give a better understanding of the use of either.

Referring particularly to Figure 2 I have shown therein the tractor as stated. It includes curved leg-engaging members 1 and 2, respectively, which are preferably made of light metal such as aluminum, and formed to fit the curve of the leg. Each of these members is provided with laterally extending end flanges as shown at 1a and 2a so as to secure a firm hold in the plaster as hereinafter described. The leg-engaging member 1 has secured to it a flat bar 3 which is bent at right angles at 4, as shown in the drawings. The member 2 is secured by means of a short flat bar 5 to a sleeve 6 which is adjustable on the bar 4 and which may be secured in adjusted position by set screws 7.

Near the bend 4a between the bar 4 and the flat bar 3 is an L-shaped swivel member 8 which is pivotally mounted at 9 and which is provided with an opening 10 (see Fig. 3). Arranged to extend through said opening is a rod 11, having a fork 12 at one end, which is pivotally connected at 13 with a lever 14. A spring 15 bears on the swivel 8 at one end, and on a winged nut 16 on the threaded end 11a of the rod 11.

The lever 14 is mounted on a fixed pivot pin 17 carried by the bar 4 and is preferably provided with upper and lower bosses 18. A cotter pin 19 passes through the pivot pin 17 so as to permit the removal of the lever if desired. Thus the tractor may be adapted for either the right or left leg by removing the lever 14 from the pivot and turning it over, if necessary. The end of the lever 14 is bent as shown in the drawings and is provided with openings 20 through which a connecting member, such as a hook 21, may be secured. The device just described constitutes the main feature of the invention in the present instance. It may be used in connection with any suitable means which can be attached to the leg of the patient.

In the drawings I have shown a device disclosed in the patent to Ettinger, 1,967,471. This device consists of a wire or pin 22 which is passed through the lower end of the fractured femur and which has wire gripping and stretching mechanism 23 and a head 24 to which the hook 21 of the tractor may be attached.

The immobilizer portion of the splint is shown in Figs. 4 to 7, inclusive. Referring particularly to Fig. 5 it will be seen that there is a long arm 25 having at one end a fork provided with pintle bearings 25a. The arm 25 may be extended by a slidable portion 26 which is provided with a slot 27 through which a bolt 28 carried by the arm 25 may extend. A nut 29 is provided for securing the slidable portion 26 at the desired position. One end of the member 26 is T-shaped. One lateral portion of the T is bent at right angles to underlie the bar 25, as shown at 30. The other laterally extending portion of the T is bent over the opposite edge of the bar 25 and extends for a short distance along the side of the bar as shown at 31. The end of the arm member 26 is provided with a central pintle bearing 32 which fits in between the forked bearings 33 of a yoke 34. The latter bears a curved leg-engaging portion 35 and a portion 36 which is integral therewith and which is adapted to lie parallel to the leg of the patient.

A short arm portion 37 has a central pintle bearing 38 arranged to enter between spaced pintle bearings 39a of a plate 39 (see Fig. 6). This plate 39 in turn is designed to enter between the pintle bearings 25a of the arm portion 25 so that when the pintle is inserted therein through the aligned bearings the arms 25 and 37 will both be hinged to the plate 39 along the same axis. The plate 39 is provided with an opening through which a bolt 40 is passed. The latter extends through a slot 41 in a quadrant 42 and the latter bears a curved leg-engaging member 43 and an integral leg-engaging member 44 adapted to extend parallel with the leg.

The arm 37 has an extension portion 45 which is slotted as at 46 to receive a bolt 47 carried by the arm 37 and provided with a winged nut 48 to hold the extension in adjusted position. This extension has a sleeve 49 at one end which encircles the arm 37. The extension 45 has a central pintle bearing 50 arranged to align with the pintle bearings 51. The latter are secured to a curved leg portion 52 having a lateral extension 53, as shown in Fig. 5.

From the foregoing description of the parts of the splint assembly the operation thereof may be readily understood.

Assuming that the femur is fractured, a wire, like that shown at 22 in Fig. 1, is put through the lower end of the fractured femur and a light plaster-of-Paris cast is applied to the well leg, i. e., the left leg shown in Fig. 1. This cast extends well above the knee, with the leg straight, and going down incorporating the foot as in other ordinary types of well leg splints. The sole of the foot, as well as the malleoli, are well padded, as is the knee, and over the inner side of the head of the tibia. A light plaster-of-Paris cast, well padded over the dorsum of the foot and both malleoli, is then applied to the foot and lower part of the injured leg.

Having applied these casts the part of the splint assembly, described as the "immobilizer", is applied, as shown in Fig. 4. In this figure it will be noted that the splint portions 43 and 44 are placed in position and each secured by a few turns of plaster-of-Paris just above the inner maleolus of the fractured leg. The opposite end of the extended bar, having the members 52 and 53, is applied to the well leg of the patient and is secured by a few turns of plaster-of-Paris to the leg just above the inner malleolus. The length of the shorter arm may be adjusted to suit the case and the desired separation of the feet. Rotation of the injured leg is accomplished by means of the quadrant 42. The longer arm, composed of the arm members 25 and 26 is now secured to the sound leg below the knee joint by a few turns of plaster-of-Paris. It will be observed that the portion 36 points toward the foot instead of toward the knee, as do the members 44 and 53 at the ends of the short arm.

In applying plaster-of-Paris for securing the T-shaped bands one must be careful not to interfere with the free movements of the hinges. Plenty room is allowed on the bands to secure them firmly without incorporating the hinges. When the limbs of the patient are in the proper position and the immobilizer has been applied the thumb nuts are tightened.

The tractor is now applied to the cast of the sound leg by adjusting the members 1 and 2 (see Fig. 2) to the size of the leg. The members 1 and 2 are then secured in position by a few turns of plaster-of-Paris. The set screws 7 may well hold the members 1 and 2 at a definite position apart when they are tightened, although the binding of these members with the plaster-of-Paris will serve substantially the same purpose when the plaster is set.

After the tractor has been attached the nut 16 is run out to the end of the threaded portion 11a and this allows the short end of the lever to approach the connecting means between the wire 22 and the lever. Thus the head 24 of the Ettinger device above mentioned may be secured to the short end of the lever by the hook 21.

The nut 29 on the long arm of the immobilizer is now loosened and removed so as to permit the separation of the arm members 25 and 26 so as to prevent friction. The wing nut 16 is now turned so as to exert tension on the lever 14 and this will pull on the fractured leg.

It will be noted that by placing the fulcrum of the lever 14 near the end of the bar 4 two important results are accomplished. One is the gain in power which the leverage affords, but equally important is the fact that with the fulcrum so placed there is not the pressure exerted in the hip of the well leg as there would be if the fulcrum were farther over toward the well leg.

When satisfactory reduction has been attained, the members 25 and 26 of the diagonal bar are connected up again, the plaster around the tractor on the sound leg is cut away, the Ettinger connection is released, the wire 22 removed, and the roughness of the cast left by the removal of the tractor is smoothed over by a few turns of plaster-of-Paris. The immobilizer now holds the limbs in proper position, no other cumbersome apparatus being necessary.

I claim:

1. In a surgical splint, a tractor portion comprising a leg-engaging member, a flat metal strip secured to said leg-engaging member and having a laterally bent portion constituting a spacing bar, a second leg-engaging member facing the first-named leg-engaging member, a bar secured to said second-named leg engaging member and having a sleeve at its end for slidably mounting said second-named leg-engaging member for movement toward and away from the first-named leg-engaging member, means for securing the leg engaging members in adjusted position, a swivel carried by said spacing bar near the bend thereof and provided with an opening, a pivot pin carried by said spacing bar near the opposite end thereof, a lever mounted on said pivot pin, a rod arranged to pass through the opening of the swivel and being threaded at one end, a winged nut carried by the threaded end, a spring disposed between the swivel and the winged nut, the opposite end of the rod being pivotally connected at one end of the lever, and means including a hook for attaching one end of the lever to a leg of a patient, said spacing bars and lever being adapted to be located above the legs of the patient and inwardly of the feet.

2. In a surgical splint, a tractor portion comprising a pair of leg-engaging members, a spacing bar, means for adjustably securing one of said leg-engaging members to said spacing bar, the other leg-engaging member being secured to one end of the spacing bar, said members depending from the bar, a lever fulcrumed at the other end of said spacing bar, a swivel carried by said spacing bar at the other end, a rod pivotally mounted at one end of said lever and arranged to pass through the swivel, said rod being threaded at its end, a nut carried by said rod for drawing the end of the lever toward the swivel, and means connected with the lever on the opposite side of the fulcrum for attachment to the leg of a patient, said spacing bars and lever being adapted to be located above the legs of the patient and inwardly of the feet.

3. In a surgical splint, a tractor portion comprising a flat spacing bar having a lateral bend, a leg-engaging portion rigidly secured to the bent end of the spacing bar, a second leg-engaging portion slidably mounted on said spacing bar and movable toward and away from the first leg-engaging portion, said leg-engaging portions depending from the spacing bar, a lever comprising a flat bar fulcrumed near the end of the spacing bar, means carried by the spacing bar near the bent portion for exerting tension on the lever, and connections to the lever on the opposite side of the fulcrum for attachment to the leg of a patient, said spacing bars and lever being adapted to be located above the legs of the patient and inwardly of the feet.

4. In a surgical splint, a tractor portion comprising a spacing bar, a pair of leg-engaging members secured to said spacing bar, said leg-engaging portions depending from the spacing bar, a lever fulcrumed at one end of said spacing bar, means carried by said spacing bar for exerting tension on one end of the lever, means at the opposite end of the lever for attachment to the leg of a patient, said spacing bars and lever being adapted to be located above the legs of the patient and inwardly of the feet.

CHARLES H. WATT.